(12) United States Patent
Jung et al.

(10) Patent No.: US 10,257,873 B2
(45) Date of Patent: Apr. 9, 2019

(54) METHOD AND ELECTRONIC DEVICE FOR PROVIDING TETHERING SERVICE

(71) Applicant: SAMSUNG ELECTRONICS CO., LTD., Suwon-si, Gyeonggi-do (KR)

(72) Inventors: Buseop Jung, Hwaseong-si (KR); Vimal Bastin Edwin Joseph, Bangalore KA (IN); Hyuk Kang, Yongin-si (KR); Inji Jin, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/410,940

(22) Filed: Jan. 20, 2017

(65) Prior Publication Data

US 2017/0223758 A1    Aug. 3, 2017

(30) Foreign Application Priority Data

Jan. 29, 2016 (KR) ........................ 10-2016-0011304

(51) Int. Cl.
| | |
|---|---|
| *G06F 15/16* | (2006.01) |
| *H04W 76/14* | (2018.01) |
| *H04W 76/15* | (2018.01) |
| *H04W 4/80* | (2018.01) |
| *H04L 29/08* | (2006.01) |

(52) U.S. Cl.
CPC ............ *H04W 76/14* (2018.02); *H04L 67/14* (2013.01); *H04W 4/80* (2018.02); *H04W 76/15* (2018.02); *H04L 67/1061* (2013.01)

(58) Field of Classification Search
None
See application file for complete search history.

(56) References Cited

U.S. PATENT DOCUMENTS

| | | | |
|---|---|---|---|
| 9,037,763 B2 | 5/2015 | Huang et al. | |
| 9,075,923 B2 | 7/2015 | Sadeghi et al. | |
| (Continued) | | | |

FOREIGN PATENT DOCUMENTS

| | | |
|---|---|---|
| EP | 2 713 635 A1 | 4/2014 |
| WO | 2014/189641 | 11/2014 |

OTHER PUBLICATIONS

Search Report dated May 12, 2017 in counterpart International Patent Application No. PCT/KR2017/000893.

(Continued)

*Primary Examiner* — Brandon M Renner
(74) *Attorney, Agent, or Firm* — Nixon & Vanderhye P.C.

(57) ABSTRACT

A method and electronic device for providing a tethering service is provided. The electronic device of the present disclosure includes a communication interface comprising communication circuitry and a processor configured to establish a direct connection with at least one external electronic device located in operable proximity of the electronic device using the communication interface, to check a predetermined input, to establish a session for connecting the at least one external device to at least one communication network via the electronic device based on the predetermined input, and to connect the at least one external electronic device to the at least one communication network via the electronic device during at least part of the direct connection session.

18 Claims, 17 Drawing Sheets

(56) References Cited

U.S. PATENT DOCUMENTS

| | | | |
|---|---|---|---|
| 9,084,236 B2 | 7/2015 | Kim et al. | |
| 2010/0306339 A1* | 12/2010 | Ling | H04L 67/104 |
| | | | 709/213 |
| 2012/0051347 A1* | 3/2012 | Kumar | H04W 52/0261 |
| | | | 370/338 |
| 2012/0054353 A1* | 3/2012 | Jung | H04W 88/04 |
| | | | 709/227 |
| 2012/0265913 A1 | 10/2012 | Suumaeki et al. | |
| 2014/0085666 A1 | 3/2014 | Park | |
| 2014/0127992 A1 | 5/2014 | Kuscher et al. | |
| 2014/0254499 A1 | 9/2014 | Hassan et al. | |
| 2014/0337923 A1 | 11/2014 | Anders et al. | |
| 2014/0351445 A1 | 11/2014 | Davidson et al. | |
| 2015/0038081 A1 | 2/2015 | Bandyopadhyay et al. | |
| 2015/0205747 A1* | 7/2015 | Dees | H04M 1/7253 |
| | | | 710/303 |
| 2015/0220290 A1 | 8/2015 | Park et al. | |
| 2015/0282040 A1 | 10/2015 | Daniel et al. | |
| 2015/0296416 A1 | 10/2015 | Lee | |
| 2016/0085703 A1* | 3/2016 | Sadeghi | G06F 13/385 |
| | | | 710/313 |
| 2017/0251354 A1* | 8/2017 | Lee | H04W 8/005 |

OTHER PUBLICATIONS

Extended European Search Report for EP Application No. 17744562.4 dated Nov. 12, 2018.

* cited by examiner

METHOD AND ELECTRONIC DEVICE FOR PROVIDING TETHERING SERVICE

CROSS-REFERENCE TO RELATED APPLICATION

The present application is based on and claims priority under 35 U.S.C. § 119 to a Korean patent application filed on Jan. 29, 2016 in the Korean intellectual property office and assigned serial number 10-2016-0011304, the disclosure of which is incorporated by reference herein in its entirety.

TECHNICAL FIELD

The present disclosure relates generally to a method and electronic device for providing a tethering service.

BACKGROUND

Tethering is a function that enables a device to connect to a network via another device capable of connecting to the network. The tethering service may be provided by means of a Bluetooth connection, a Wireless Fidelity (Wi-Fi) hotspot, or Universal Serial Bus (USB) connection, and the tendering device connectable to the network works as a modem of the tethered device.

The tethering device which provides the tethering service using a Wi-Fi hotspot cannot enable multiple communication services (such as Wi-Fi hotspot service, legacy Wi-Fi connection service, and Wi-Fi Direct service) simultaneously.

In order to provide the tethering service via a Wi-Fi hotspot in a situation where two devices are performing peer to peer (P2P) communication through the Wi-Fi Direct service, it is required first to release the Wi-Fi Direct connection and then establish a Wi-Fi connection for tethering the same device.

In contrast, in order to establish a P2P connection between the devices that are communicating through the tethering service by means of a Wi-Fi hotspot (or mobile hotspot), it is required first to release the Wi-Fi hotspot connection and then establish a Wi-Fi Direct connection separately. This means that the electronic device which is engaged in an ongoing Wi-Fi Direct communication cannot provide the user with the Wi-Fi hotspot-based tethering service.

SUMMARY

In accordance with an example aspect of the present disclosure, an electronic device is provided. The electronic device includes a communication interface comprising communication circuitry and a processor configured to establish a direct connection with at least one external electronic device located in operable proximity of the electronic device using the communication circuitry of the communication interface, to check a predetermined input, to establish a session for connecting the at least one external device to at least one communication network via the electronic device based on the predetermined input, and to connect the at least one external electronic device to the at least one communication network via the electronic device during at least part of the direct connection session.

In accordance with another example aspect of the present disclosure, an electronic device is provided. The electronic device includes a communication interface comprising communication circuitry and a processor configured to connect at least one external electronic device located in operable proximity of the electronic device to an at least one communication network using the communication circuitry of the communication interface, to check a predetermined input, to establish a session for a direct connection with the at least one external electronic device based on the predetermined input, and to enable the direct connection with the at least one external device during at least part of the session maintained with the at least one network.

In accordance with another example aspect of the present disclosure, a method of tethering an electronic device is provided. The method includes establishing a direct connection with at least one external electronic device located in operable proximity of the electronic device using a communication interface, checking a predetermined input, establishing a session for connecting the at least one external device to at least one communication network via the electronic device based on the predetermined input, and connecting the at least one external electronic device to the at least one communication network via the electronic device during at least part of the direct connection session.

In accordance with still another example aspect of the present disclosure, a method of tethering an electronic device is provided. The method includes connecting at least one external electronic device located in operable proximity of the electronic device to an at least one communication network using a communication interface, checking a predetermined input, establishing a session for a direct connection with the at least one external electronic device based on the predetermined input, and enabling the direct connection with the at least one external device during at least part of the session maintained with the at least one network.

BRIEF DESCRIPTION OF THE DRAWINGS

The above and other aspects, features and attendant advantages of the present disclosure will become more readily appreciated and understood from the following detailed description, taken in conjunction with the accompanying drawings, in which like reference numerals refer to like elements, and wherein.

DETAILED DESCRIPTION

Figure 1:
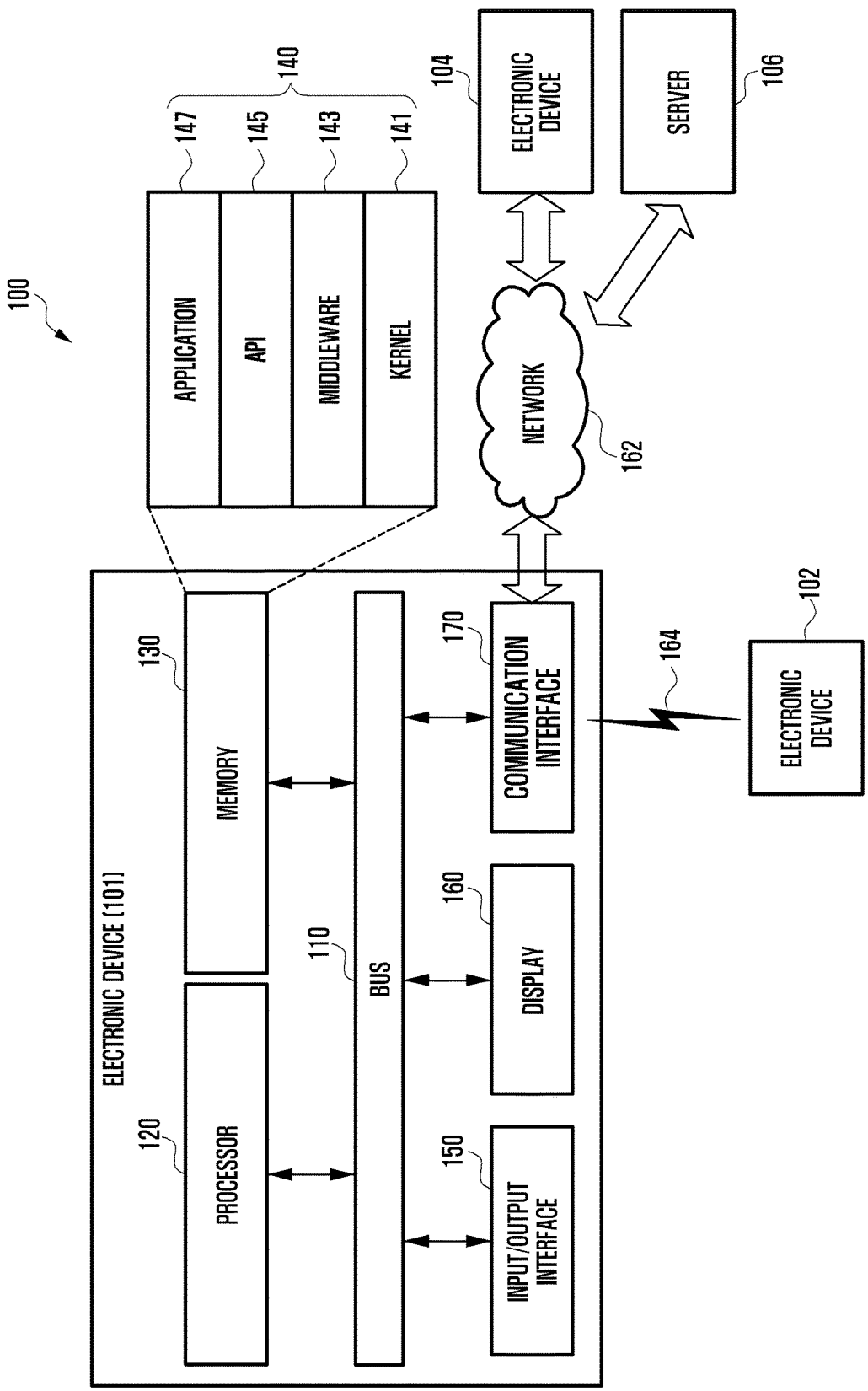
FIG. 1 is a diagram illustrating an example network environment include electronic devices according to various example embodiments of the present disclosure.

Hereinafter, various example embodiments of the present disclosure are described in greater detail with reference to the accompanying drawings. While the present disclosure may be embodied in many different forms, various example embodiments of the present disclosure are illustrated in drawings and are described herein in detail, with the understanding that the present disclosure is to be considered as an example of the principles of the disclosure and is not intended to limit the disclosure to the various example embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first element may be referred to as a second element without deviating from the scope of the present disclosure, and similarly, a second element may be referred to as a first element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not intended to limit the present disclosure but to illustrate example embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of ordinary skill in the art. It should be understood that generally using terms defined in a dictionary have a meaning corresponding to that of a context of related technology and are not interpreted in an ideal or excessively formal manner unless explicitly defined.

In this disclosure, an electronic device may be a device that includes a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), or the like, but is not limited thereto.

According to some example embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, or the like, but is not limited thereto.

According to some example embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, or the like, but is not limited thereto.

According to some example embodiments, an electronic device may be furniture or part of a building or construction having a communication function, an electronic board, an electronic signature receiving device, a projector, or various measuring instruments (e.g., a water meter, an electric meter, a gas meter, a wave meter, etc.), or the like, but is not limited thereto. An electronic device disclosed herein may be one of the above-mentioned devices or any combination thereof. As well understood by those skilled in the art, the above-mentioned electronic devices are examples only and not to be considered as a limitation of this disclosure.

FIG. 1 is a block diagram illustrating an example electronic apparatus 101 in a network environment 100 according to an example embodiment of the present disclosure.

Referring to FIG. 1, the electronic apparatus 101 may include a bus 110, a processor (e.g., including processing circuitry) 120, a memory 130, an input/output interface (e.g., including input/output circuitry) 150, a display 160, and a communication interface (e.g., including communication circuitry) 170.

The bus 110 may be a circuit for interconnecting elements described above and for allowing a communication, e.g. by transferring a control message, between the elements described above.

The processor 120 may include various processing circuitry and can receive commands from the above-mentioned other elements, e.g. the memory 130, the input/output interface 150, the display 160, and the communication interface 170, through, for example, the bus 110, can decipher the received commands, and perform operations and/or data processing based on the deciphered commands.

The memory 130 can store commands received from the processor 120 and/or other elements, e.g. the input/output interface 150, the display 160, and the communication interface 170, and/or commands and/or data generated by the processor 120 and/or other elements. The memory 130 may include software and/or programs 140, including, for example, a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 100.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 100 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input/output interface 150 may include various input/output circuitry and can receive, for example, a command and/or data from a user, and transfer the received command and/or data to the processor 120 and/or the memory 130 through the bus 110. The display 160 can display an image, a video, and/or data to a user.

The communication interface 170 may include various communication circuitry and can establish a communication between the electronic apparatus 100 and another electronic devices 102 and 104 and/or a server 106. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, short-range communication 164, or the like. Each of the electronic devices 102 and 104 may be a same type and/or different types of electronic apparatus.

Figure 2:
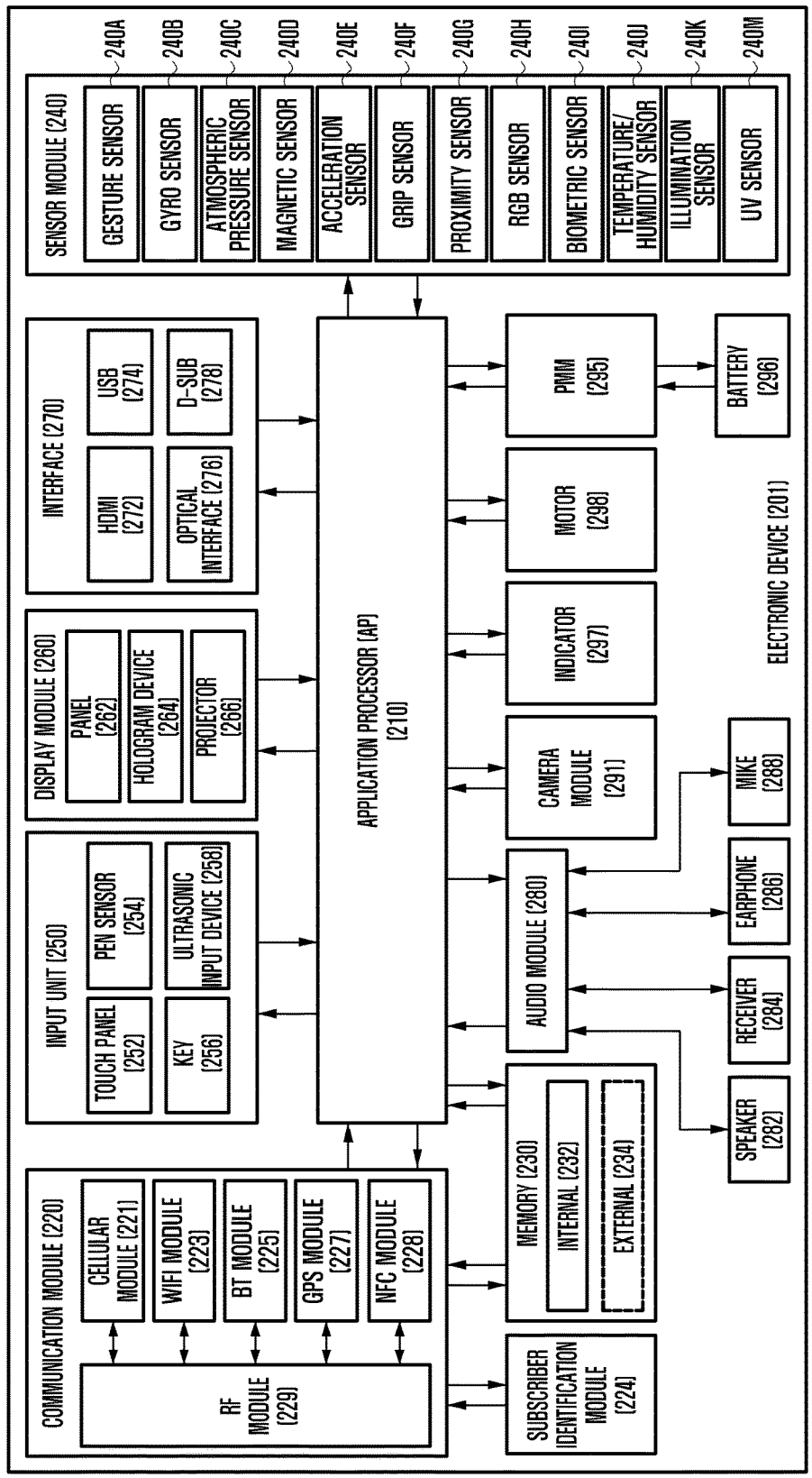
FIG. 2 is a block diagram illustrating an example configuration of an electronic device according to various example embodiments of the present disclosure.

FIG. 2 is a block diagram illustrating an example electronic device 201 in accordance with an example embodiment of the present disclosure. The electronic device 201 may form, for example, the whole or part of the electronic device 101 illustrated in FIG. 1. Referring to FIG. 2, the electronic device 201 may include at least one application processor (AP) (e.g., including processing circuitry) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, and a motor 298.

The AP 210 may include various processing circuitry configured to drive an operating system or applications, control a plurality of hardware or software components connected thereto, and also perform processing and operation for various data including multimedia data. The AP 210 may include various processing circuitry, such as, for example, and without limitation, one or more of a dedicated processor, a CPU, or the like, and may be formed as a system-on-chip (SoC), for example. According to an example embodiment, the AP 210 may further include a graphic processing unit (GPU) (not shown).

The communication module 220 (e.g., the communication interface 160) may include various communication circuitry configured to perform a data communication with any other electronic device (e.g., the electronic device 104 or the server 106) connected to the electronic device 200 (e.g., the electronic device 101) through the network. According to an example embodiment, the communication module 220 may include various communication circuitry, such as, for example, and without limitation, one or more of a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UNITS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an example embodiment, the cellular module 221 may include a communication processor (CP). Additionally, the cellular module 221 may be formed as an SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an example embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM 224 may include a specific card formed of SIM and may be inserted into a slot formed at a certain place of the electronic device. The SIM card 224 may contain therein an ICCID (Integrated Circuit Card IDentifier) or an IMSI (International Mobile Subscriber Identity).

The memory 230 (e.g., the memory 130) may include an internal memory 232 and/or an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an example embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electrical signals. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include various input circuitry, such as, for example, and without limitation, one or more of a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, LCD (Liquid Crystal Display), AM-OLED (Active Matrix Organic Light Emitting Diode), or the like, but is not limited thereto. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include various interface circuitry, such as, for example, and without limitation, one or more of an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module (PMM) 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 3:
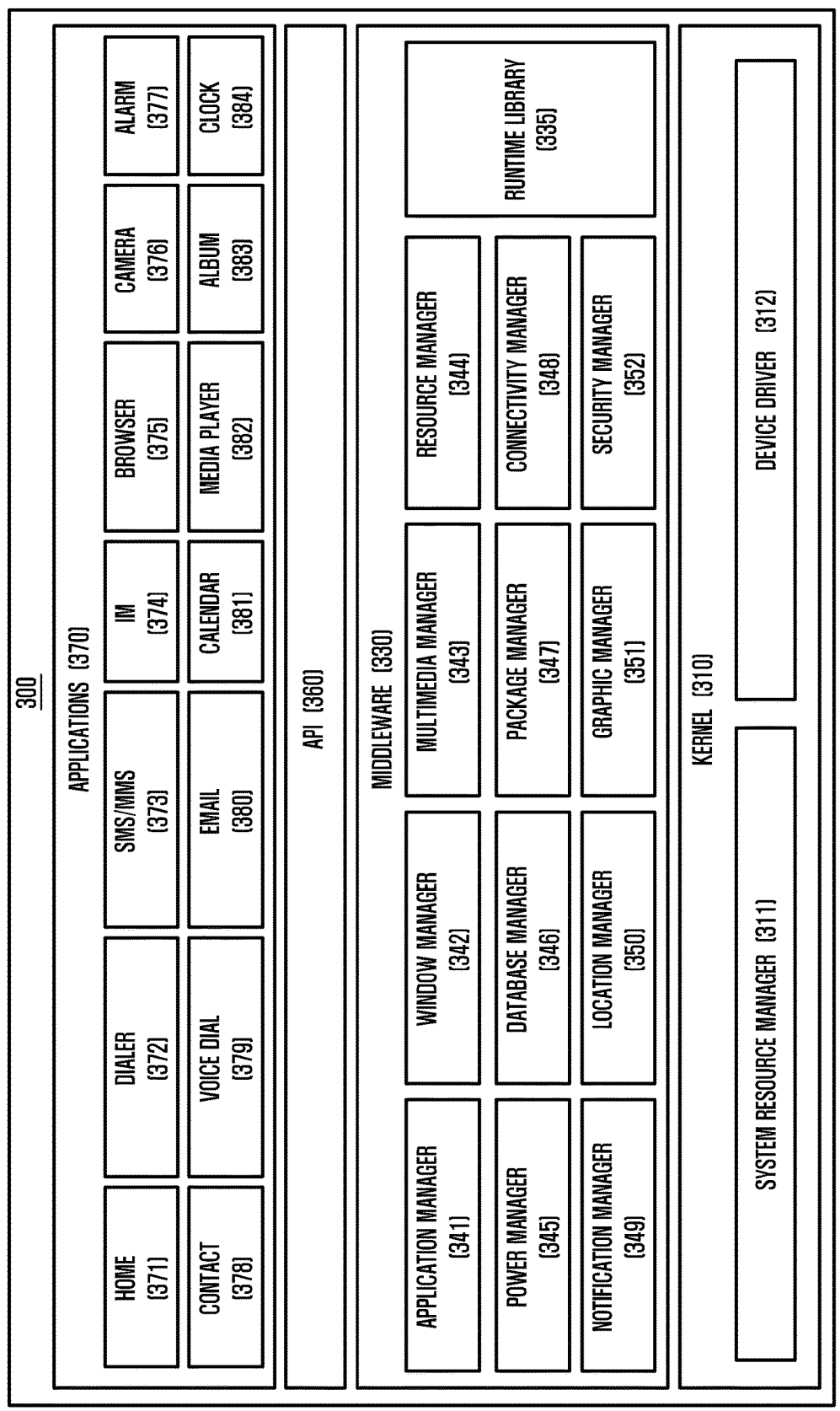
FIG. 3 is a block diagram illustrating an example configuration of a program module according to various example embodiments of the present disclosure.

FIG. 3 is a block diagram illustrating an example configuration of a programming module 300 according to an example embodiment of the present disclosure.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 141) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Figure 4:
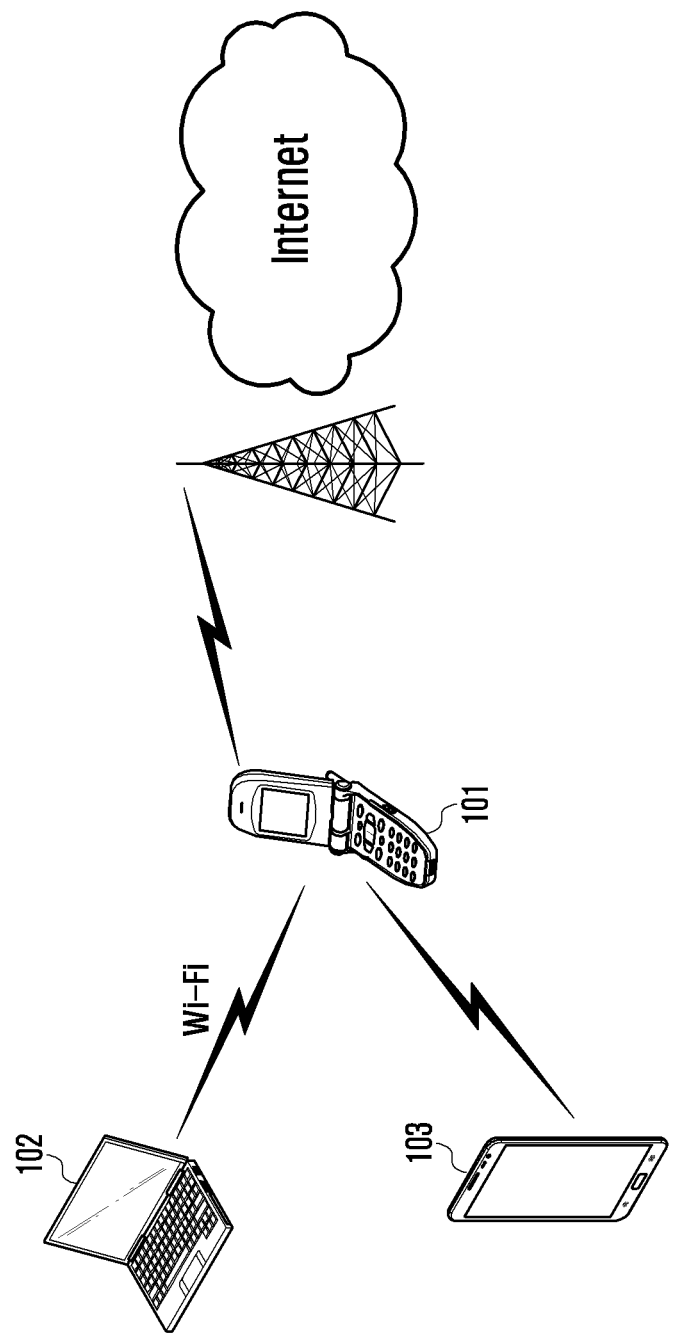
FIG. 4 is a diagram illustrating an example network for providing a Wi-Fi-based tethering service according to various example embodiments of the present disclosure.

FIG. 4 is a diagram illustrating an example network for providing a Wi-Fi-based tethering service according to various example embodiments of the present disclosure.

Referring to FIG. 4, the electronic device 101 operating as a host may provide the electronic devices 102 and 103 operating as clients with a Wi-Fi-based tethering service. For example, the tethering service may be a technique for allowing the electronic devices 102 and 103 to connect to a network via the electronic device 101 capable of connecting to the network. For example, the tethering host device 101 may operate as a modem of the tethering client devices 102 and 103. Meanwhile, the tethering service may be provided over Bluetooth or USB.

According to various example embodiments of the present disclosure, the electronic device 101 may use a Wi-Fi hotspot function or a Wi-Fi serial bus (WSB) function to provide the Wi-Fi-based tethering service. For example, the WSB may be a wireless alternative of the legacy USB cord.

According to various example embodiments of the present disclosure, the electronic device 101 may not be able use a legacy Wi-Fi or a Wi-Fi Direct service while it is providing the Wi-Fi hotspot tethering service. For example, if it is necessary to provide the Wi-Fi hotspot tethering service during a Wi-Fi Direct-based P2P communication, the electronic device 101 may release the Wi-Fi Direct connection before establishing a Wi-Fi connection for providing the tethering service to the corresponding electronic device.

According to various example embodiments of the present disclosure, the electronic device may use WSB to provide the Wi-Fi tethering service during the Wi-Fi Direct communication. This may refer, for example, to a situation in which the electronic devices may operate in a seamless communication environment negating the need to release the ongoing Wi-Fi Direct connection for preparing the Wi-Fi tethering service.

Figure 5:
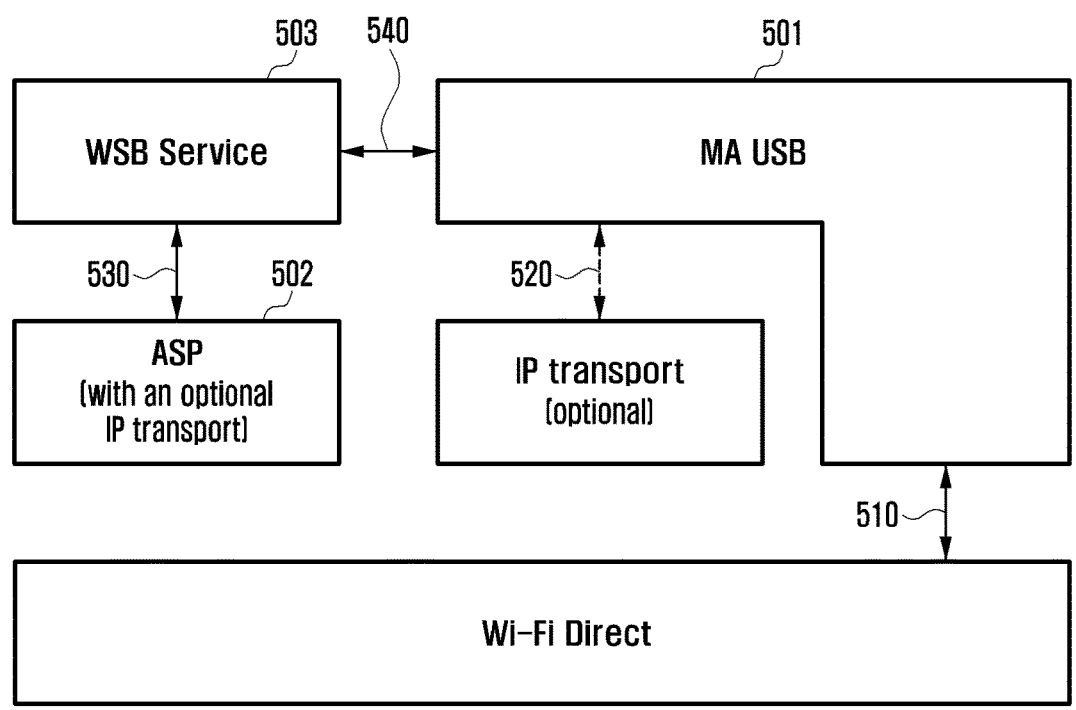
FIG. 5 is a diagram illustrating an example Wi-Fi serial bus (WSB) mechanism as a standard for providing (WSB) service according to various example embodiments of the present disclosure.

FIG. 5 is a diagram illustrating an example WSB mechanism as a standard for providing a Wi-Fi serial bus (WSB) service according to various example embodiments of the present disclosure.

According to various example embodiments of the present disclosure, the electronic device 101 may use the WSB feature to provide the Wi-Fi tethering service. Typically, the Universal Serial Bus (USB) is known as a representative wired interface standard. The electronic device 101 may secure a cordless environment while maintaining the legacy USB features using the WSB as a wireless alternative of the USB.

In the example embodiment of FIG. 5, the electronic device 101 may use the basic WSB configuration specified by the Wi-Fi alliance (WFA). For example, the WSB may operate in the operation mode of Wi-Fi Direct as a Wi-Fi P2P communication standard.

According to various example embodiments of the present disclosure, the electronic device 101 may perform a USB communication by means of a Media Agnostic Universal Serial Bus (MA USB) module 501 after a Wi-Fi Direct link connection has been established or Application Software Platform-based (ASP-based) WSB session setup has been completed.

According to various example embodiments of the present disclosure, the MA USB module 501 uses the Wi-Fi Direct for a mandatory path and the Internet Protocol (IP) transport for an optional path as denoted by reference numbers 510 and 520.

According to various example embodiments of the present disclosure, the ASP module 502 may search for a terminal supporting the WSB service and establish a WSB session with the found terminal 530.

According to various example embodiments of the present disclosure, the WSB service module 503 may generate a connection event and service teardown trigger 540 to the MA USB module 501.

Figure 6:
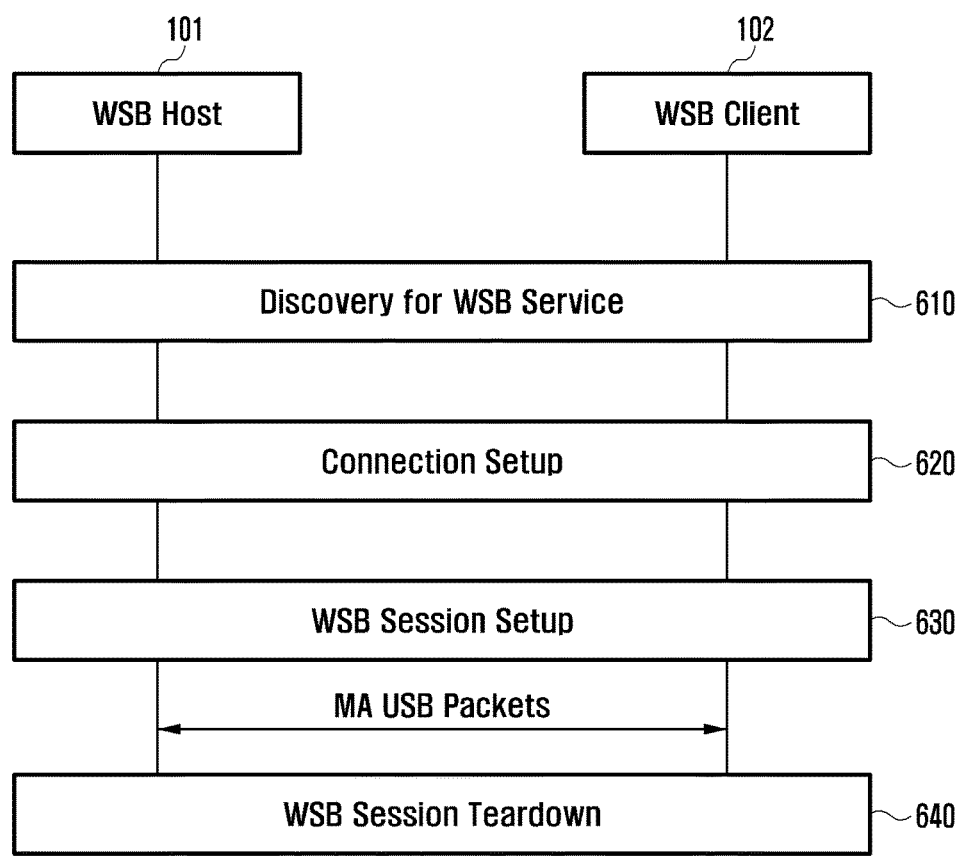
FIG. 6 is a diagram illustrating an example procedure of starting with WSB service discovery and ending with WSB service teardown according to various example embodiments of the present disclosure.

FIG. 6 is a diagram illustrating an example procedure of starting with WSB service discovery and ending with WSB service teardown according to various example embodiments of the present disclosure.

In the example embodiment of FIG. 6, the electronic device 101 may operate as a WSB host, and the electronic device 102 may operate as a WSB client. The WSB service connection procedure may be divided into a WSB discovery step, a Wi-Fi Direct connection step, and an ASP-based WSB session setup step.

According to various example embodiments of the present disclosure, the electronic device 101 may discover an electronic device providing the WSB service at step 610. For example, the electronic device 101 may determine whether the electronic device 102 supports the WSB service and, if so, exchange information necessary for providing the WSB service (e.g., service name, advertisement ID, and service information) with the electronic device 102.

According to various example embodiments of the present disclosure, the WSB device discovery step may be performed based on the Application Service Platform (ASP) of the Wi-Fi Direct Service (WFDS) as the standard specified by the Wi-Fi Alliance (WFA). The advertisement ID may be a unique ID assigned per service, and the service name may denote the role of the device supporting the WSB service. For example, the service name advertised by the WSB device may be formatted as follows.

[format of service name]
org.wi-fi.wsb.[architectural element]. [baseclass]. [subclass]. [protocol]

Here, org.wi-fi.wsb is a prefix indicating WSB specified by the Wi-Fi alliance, and architectural element indicates the type of device, i.e., host or device. The subsequent fields may follow the USB descriptor information specified in the USB standard. For example, the service name of a USB mouse for which [baseclass].[subclass].[protocol] are specified as 03.00.02 in the USB standard becomes org.wi-fi.wsb.device.03.00.02. The service information may further include the detailed information on the supported WSB. Then the ASP-based WSB session setup may be performed based on the information acquired at the discovery step.

According to various example embodiments of the present disclosure, the electronic device 101 may set up a connection with the electronic device 102 at step 620. In this way, the electronic device 101 may establish a Wi-Fi Direct-based P2P group with the electronic device 102.

According to various example embodiments of the present disclosure, the electronic device 101 may set up a session with the electronic device 102 at step 630. If the session setup has been completed, the electronic device 101 may communicate data packets with the electronic device 102 by means of the MA USB module 501. According to various example embodiments of the present disclosure, during the session configuration the electronic device 101 may change the operation mode to provide the Wi-Fi Direct service (e.g., file sharing and screen sharing) or WSB tethering service exclusively or simultaneously.

According to various example embodiments of the present disclosure, the electronic device 101 may tear down the session established with the electronic device at step 640 upon detecting a teardown trigger.

Figure 7:
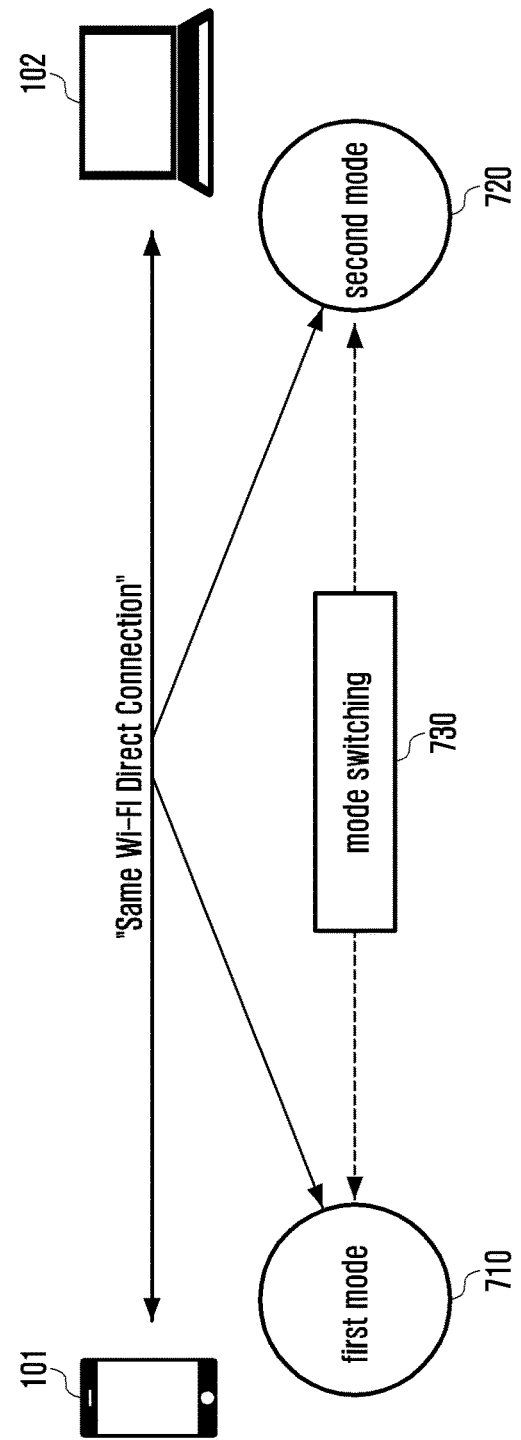
FIG. 7 is a diagram illustrating an example mechanism for providing a Wi-Fi Direct service and a WSB tethering service selectively through the session setup of the electronic device according to an example embodiment of the present disclosure.

FIG. 7 is a diagram illustrating an example mechanism for providing a Wi-Fi Direct service and a WSB tethering service selectively through the session setup of the electronic device according to an example embodiment of the present disclosure.

In the example embodiment of FIG. 7, the electronic devices 101 and 102 may establish a Wi-Fi Direct connection. The electronic device 101 may operate in a first Wi-Fi Direct mode as denoted by reference number 710 or a second Wi-Fi Direct mode as denoted by reference number 720.

According to various example embodiments of the present disclosure, the electronic device 101 having a Wi-Fi Direct connection established already may use the Wi-Fi Direct session and the WSB session selectively by means of the WSB session management 730 (or mode switching 730).

According to various example embodiments of the present disclosure, the electronic device 101 may share files (e.g., photos, documents, and audio files) with the electronic device 102 with the Wi-Fi Direct session in the first Wi-Fi Direct mode 710.

According to various example embodiments of the present disclosure, the electronic device may provide the electronic device 102 with the tethering service with the WSB session.

According to various example embodiments of the present disclosure, the electronic device 101 may operate in one of the first and second Wi-Fi Direct modes 710 and 720 selectively. For example, the electronic device 101 may be configured to operate in one of the first and second Wi-Fi Direct modes 710 and 720 at the session setup step 630 of FIG. 6.

Using the Wi-Fi Direct tethering service, it is possible to address the problem of the legacy Wi-Fi hotspot tethering service (e.g., teardown of old connection and then setup of new connection).

Figure 8:
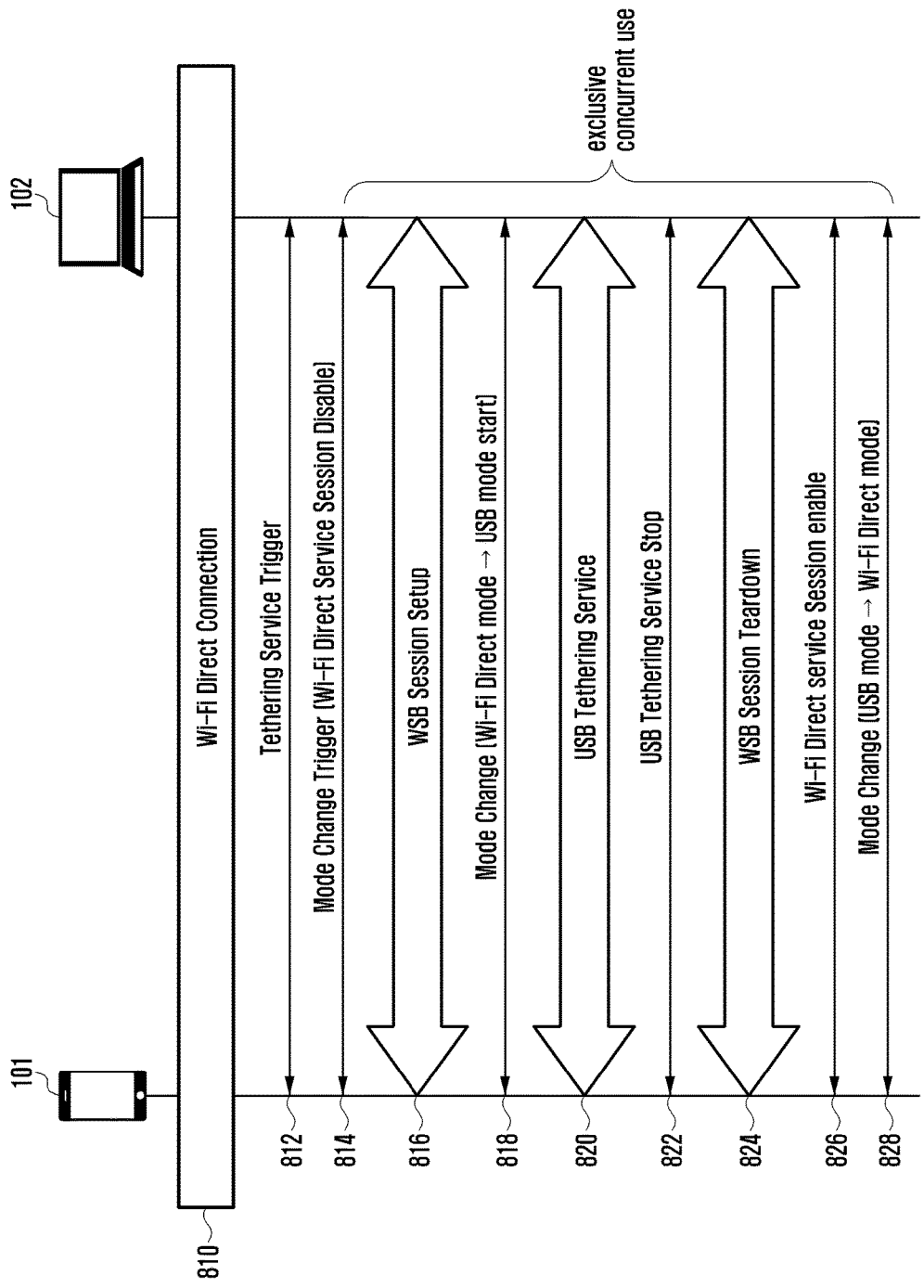
FIG. 8 is a diagram illustrating an example method for providing a Wi-Fi Direct service and a WSB tethering service exclusively through session setup of the electronic device according to various example embodiments of the present disclosure.

FIG. 8 is a diagram illustrating an example method for providing a Wi-Fi Direct service and a WSB tethering service exclusively through session setup of the electronic device according to various example embodiments of the present disclosure.

In the example embodiment of FIG. 8, the electronic device 101 may switch between the Wi-Fi Direct session and the WSB session while maintaining the Wi-Fi Direct link. The electronic device 101 may provide the Wi-Fi Direct session service (e.g., file sharing and screen sharing) and WSB session-based tethering service seamlessly without teardown of the Wi-Fi Direct connection.

According to various example embodiments of the present disclosure, the electronic device 101 may establish a Wi-Fi direct connection with the electronic device 102 at step 810. For example, the electronic devices 101 and 102 may establish a Wi-Fi Direct-based P2P group. The electronic devices 101 and 102 may exchange the information on the WSB tethering service proposed in the present disclosure as well as the WSB service information.

According to various example embodiments of the present disclosure, the electronic device 101 may detect a trigger for providing the tethering service to the electronic device 102 at step 812. For example, the electronic device 102 that wants to connect to the network may initiate the tethering service. The electronic device 101 that is capable of providing the tethering service may initiate the tethering service according to an input made through the user interface. In this case, the electronic device 101 may provide the tethering service to a device only selected in a Wi-Fi Direct group.

According to various example embodiments of the present disclosure, the electronic device 101 may perform an operation for establishing a WSB session at steps 814 and 816. The WSB session and the Wi-Fi Direct session may be established with different interface addresses and IP addresses.

According to various example embodiments of the present disclosure, the electronic device 101 may disable the old Wi-Fi Direct service session for exclusive use at step 814. In this example, the electronic device 101 cannot provide the electronic device 102 with the Wi-Fi Direct-based services (e.g., file sharing and screen sharing).

According to various example embodiments of the present disclosure, the electronic device 101 may establish a WSB session with the electronic device 102 at step 816.

According to various example embodiments of the present disclosure, if the WSB session setup has been completed successfully, the electronic device 101 may switch its operation mode from the Wi-Fi Direct mode to the WSB-based USB mode at step 818.

According to various example embodiments of the present disclosure, the electronic device 101 may provide the electronic device 102 with the USB tethering service at step 820. For example, the electronic device 101 may provide the electronic device 102 with the USB tethering service through the WSB session.

According to various example embodiments, the electronic device 101 may stop the tethering service at step 822 and perform a WSB session teardown process at step 824.

According to various example embodiments of the present disclosure, the electronic device 101 may enable the Wi-Fi Direct session at step 826 upon teardown of the WSB session and may switch its operating mode from the USB mode to the Wi-Fi Direct mode at step 828.

Figure 9:
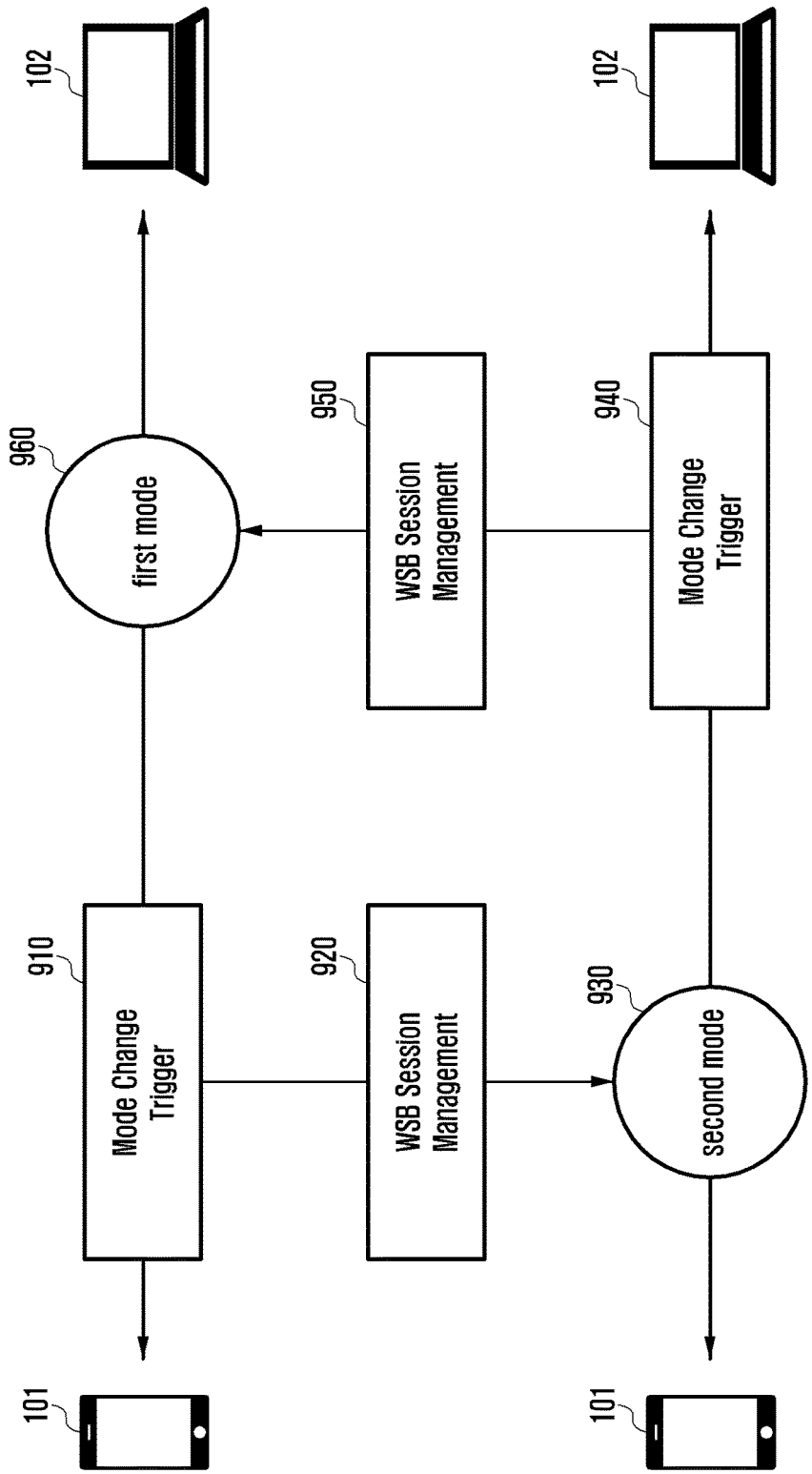
FIG. 9 is a diagram illustrating an example mechanism for switching between operation modes through session management of the electronic device according to various example embodiments of the present disclosure.

FIG. 9 is a diagram illustrating an example mechanism for switching between operation modes through session management of the electronic device according to various example embodiments of the present disclosure.

The procedure of FIG. 8 may be understood more intuitively in FIG. 9.

According to various example embodiments of the present disclosure, the electronic device 101 may connect to the electronic device 102 through a Wi-Fi Direct link. The electronic device 101 may operate in the Wi-Fi Direct mode, in which file sharing or screen sharing may be performed.

According to various example embodiments of the present disclosure, the electronic device 101 may detect a mode change trigger 910. For example, the electronic device 101 may detect a trigger for switching from the Wi-Fi Direct mode to the WSB-based USB mode.

According to various example embodiments of the present disclosure, the electronic device 101 may perform the WSB session management 920 (e.g., WSB session establishment) upon detection of the mode change trigger 910 to operate in the second mode (e.g., USB mode) 930. In the USB mode, the electronic device 101 may provide the tethering service to the electronic device 102.

According to various example embodiments of the present disclosure, the electronic device 101 may detect a mode change trigger 940. For example, the electronic device 101 may detect a mode change trigger for switching its operation mode from the WSB-based USB mode to the Wi-Fi Direct mode.

According to various example embodiments of the present disclosure, the electronic device 101 may perform the WSB session management 950 (e.g., WSB session teardown) to operate in the first mode 960 (e.g., Wi-Fi Direct mode).

Figure 10:
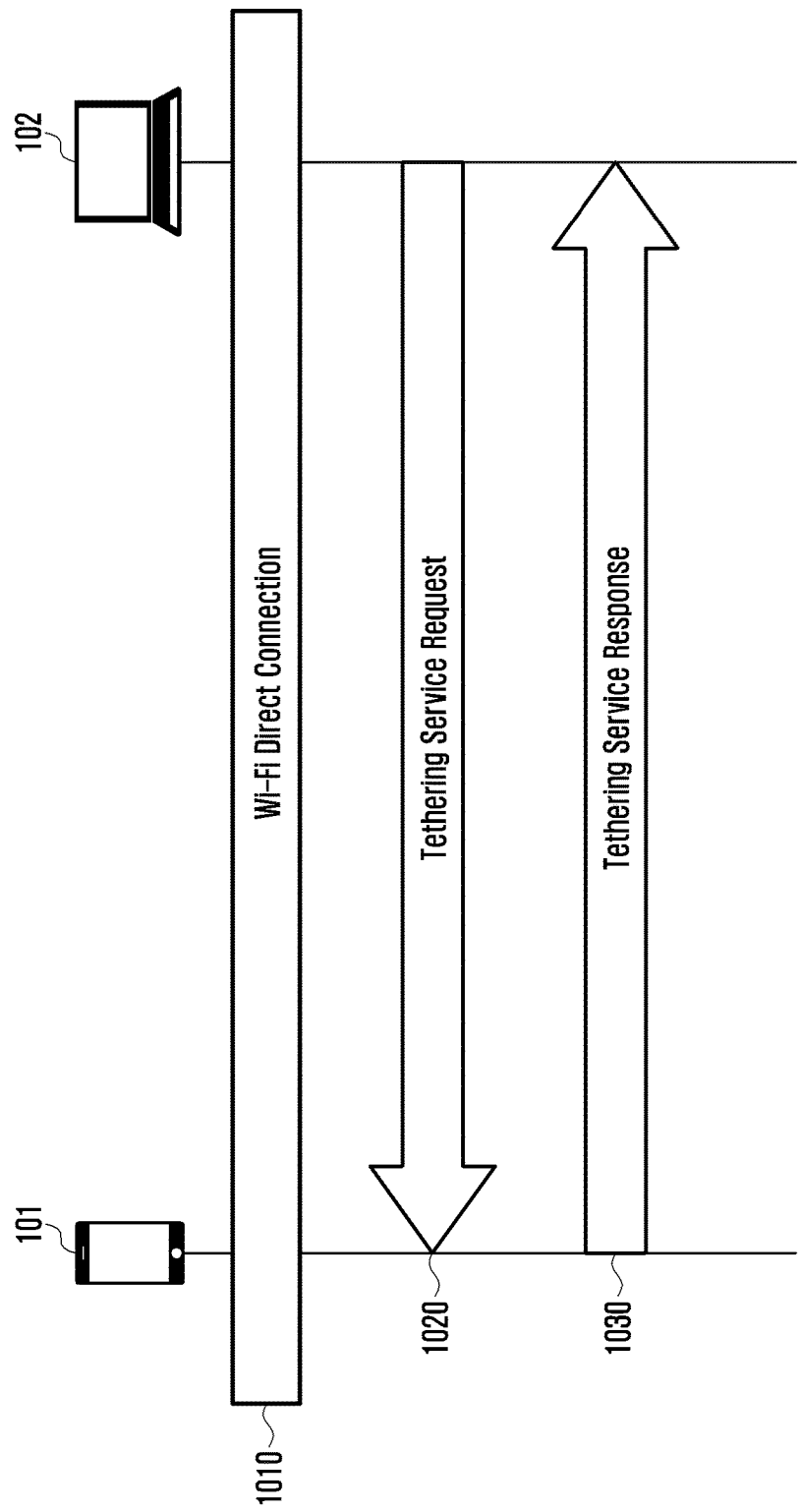
FIG. 10 is diagram illustrating an example procedure of triggering the tethering service of an electronic device according to a first example embodiment of the present disclosure.

FIG. 10 is diagram illustrating an example procedure of triggering the tethering service of an electronic device according to a first example embodiment of the present disclosure.

Although FIG. 10 is directed to a procedure in which the electronic device 102 requests to the electronic device 101 for the tethering service, the tethering service may be triggered by the electronic device 101 as a tethering host and the electronic device 102 as a tethering client.

According to various example embodiments of the present disclosure, the electronic device 101 may establish a Wi-Fi Direct connection with the electronic device 102 at step 1010. For example, the electronic devices 101 and 102 may form a Wi-Fi Direct-based P2P group. The electronic devices 101 and 102 may exchange WSB service capability information, tethering service capability information, connected network information, and other information concerning the WSB-service (e.g., service name, advertisement ID, and service information).

According to various example embodiments, the electronic device 101 may receive a Wi-Fi-based tethering service request message (e.g., P2P Action frame, Wi-Fi data frame, and L3 service protocol frame such as Upnp/Bonj our protocol frame) from the electronic device 102 at step 1020.

According to various example embodiments of the present disclosure, the electronic device 101 may accept the tethering service request automatically and provide a tethering service response at step 1030. The electronic device 101 may also accept or reject the tethering service request based on a user input. The electronic device 101 may transmit to the electronic device 102 a tethering service response message 1030 including a value indicating "accept" or "reject" in response to the tethering service request message.

According to various example embodiments of the present disclosure, the tethering service request and response messages may include the information on the roles of the electronic devices in the WSB tethering service. For example, the electronic device 101 may generate the WSB tethering role information to indicate explicitly whether it operates as the tethering host or tethering client.

Figure 11:
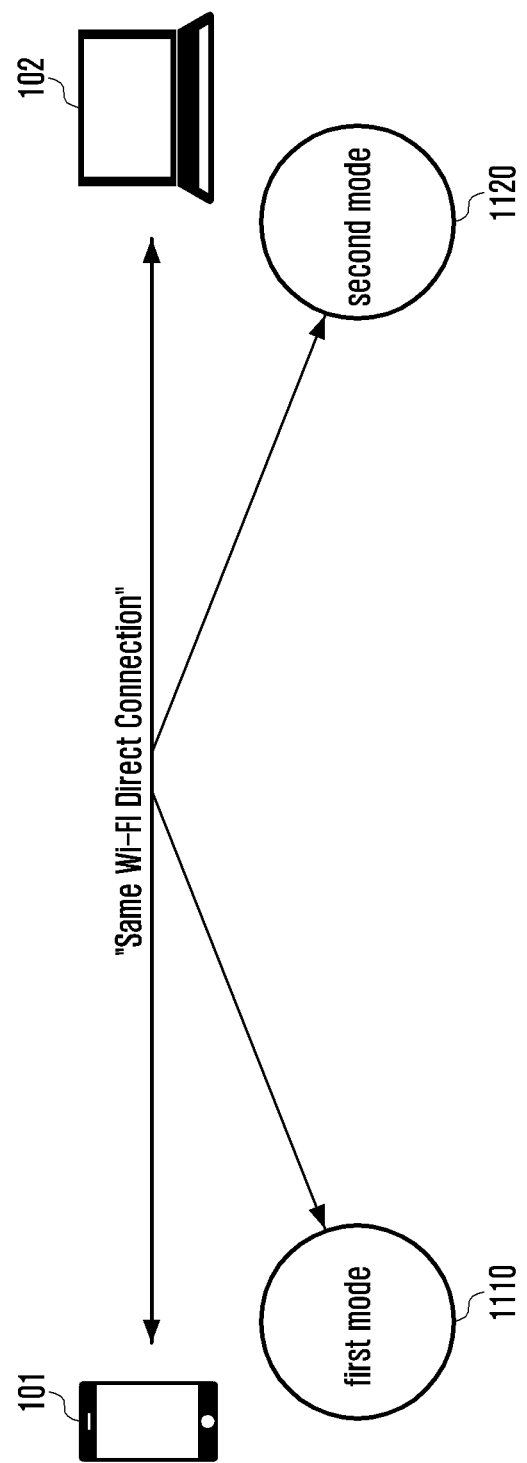
FIG. 11 is a diagram illustrating an example mechanism for an electronic device to provide Wi-Fi Direct and WSB tethering services simultaneously according to various example embodiments of the present disclosure.

FIG. 11 is a diagram illustrating an example mechanism for an electronic device to provide Wi-Fi Direct and WSB tethering services simultaneously according to various example embodiments of the present disclosure.

In the example embodiment of FIG. 11, the electronic devices 101 and 102 may connect to each other through a Wi-Fi direct link. The electronic device 101 may use the first and second Wi-Fi Direct modes 1110 and 1120 simultaneously. For example, unlike the example embodiment of FIG. 7 in which the electronic device 101 operates in one of the first and second Wi-Fi Direct modes 710 and 720 exclusively, the example embodiment of FIG. 11 is characterized in that the electronic device 101 can operate simultaneously in both the first and second Wi-Fi Direct modes 1110 and 1120. Accordingly, there is no need for the electronic device 101 to change its operation mode for establishing a session.

According to various example embodiments of the present disclosure, the electronic device 101 may share files (e.g., photos, documents, and audio files) with the electronic device 102 through the Wi-Fi Direct session in the first Wi-Fi Direct mode 1110.

According to various example embodiments of the present disclosure, the electronic device 101 may provide the electronic device 102 with the tethering service through the WSB session in the second Wi-Fi Direct mode 1120.

Using the Wi-Fi Direct tethering service, it is possible to address the problem of the legacy Wi-Fi hotspot tethering service (e.g., teardown of old connection and establishment of new connection).

Figure 12:
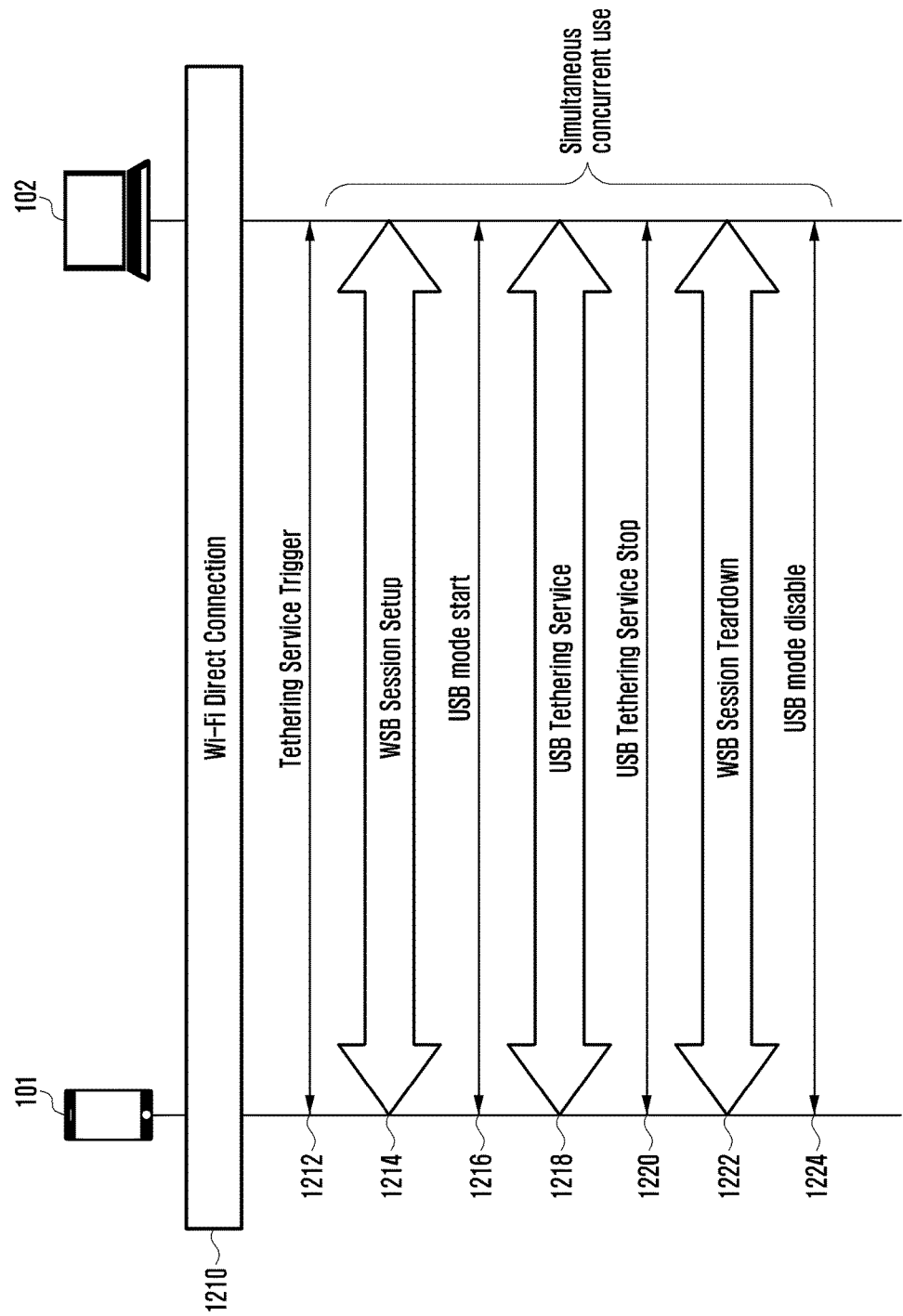
FIG. 12 is a diagram illustrating an example method for an electronic device to provide the Wi-Fi Direct-based file sharing and WSB tethering services simultaneously according to various example embodiments of the present disclosure.

FIG. 12 is a diagram illustrating an example method for an electronic device to provide the Wi-Fi Direct-based file sharing and WSB tethering services simultaneously according to various example embodiments of the present disclosure.

In the example embodiment of FIG. 12 the electronic device 101 may use a Wi-Fi Direct session and a WSB session simultaneously while maintaining the Wi-Fi Direct link. For example, the electronic device 101 is capable of providing the WSB session-based tethering service (e.g., USB connection) while maintaining the Wi-Fi Direct session service (e.g., file sharing and screen sharing) seamlessly.

According to various example embodiments of the present disclosure, the electronic device 101 may establish a Wi-Fi Direct connection with the electronic device 102 at step 1210. For example, the electronic devices 101 and 102 may establish a Wi-Fi Direct-based P2P group. The electronic devices 101 and 102 may exchange WSB service capability information, tethering service capability information, connected network information, and other information concerning the WSB-service (e.g., service name, advertisement ID, and service information).

According to various example embodiments of the present disclosure, the electronic device 101 may detect an event triggering the tethering service to the electronic device 102 at step 1212. For example, the electronic device 102 that wants to connect to the network may trigger the tethering service. It may also be possible for the electronic device 101 that has the tethering service capability to trigger the tethering service according to an input made through the user interface (UI). In this case, the electronic device 101 may provide the tethering service to a device only selected in a Wi-Fi Direct group.

According to various example embodiments of the present disclosure, the electronic device 101 may perform an operation for establishing a WSB session at step 1214. The WSB session and the Wi-Fi Direct session may be established with different interface addresses and IP addresses. In this case, the electronic device 101 may not disable the ongoing Wi-Fi direct session unlike the operation at step 814 of FIG. 8. Accordingly, the electronic device 101 may provide the electronic device 102 with the Wi-Fi Direct-based services (e.g., file sharing and screen sharing).

According to various example embodiments of the present disclosure, the electronic device 101 may establish a WSB session with the electronic device 102 at step 1216 and, if the WSB session has been established completely, execute the WSB-based USB mode. Even in this example, the Wi-Fi Direct session may be maintained.

According to various example embodiments of the present disclosure, the electronic device may provide the electronic device 102 with the USB tethering service at step 1218. For example, the electronic device 101 may provide the electronic device 102 with the USB tethering service by means of the WSB session.

According to various example embodiments of the present disclosure, the electronic device 101 may stop the tethering service at step 1220 and then tear down the WSB session at step 1222.

According to various example embodiments of the present disclosure, the electronic device 101 may disable the USB mode at step 1224 after the WSB session teardown process has been completed.

Figure 13:
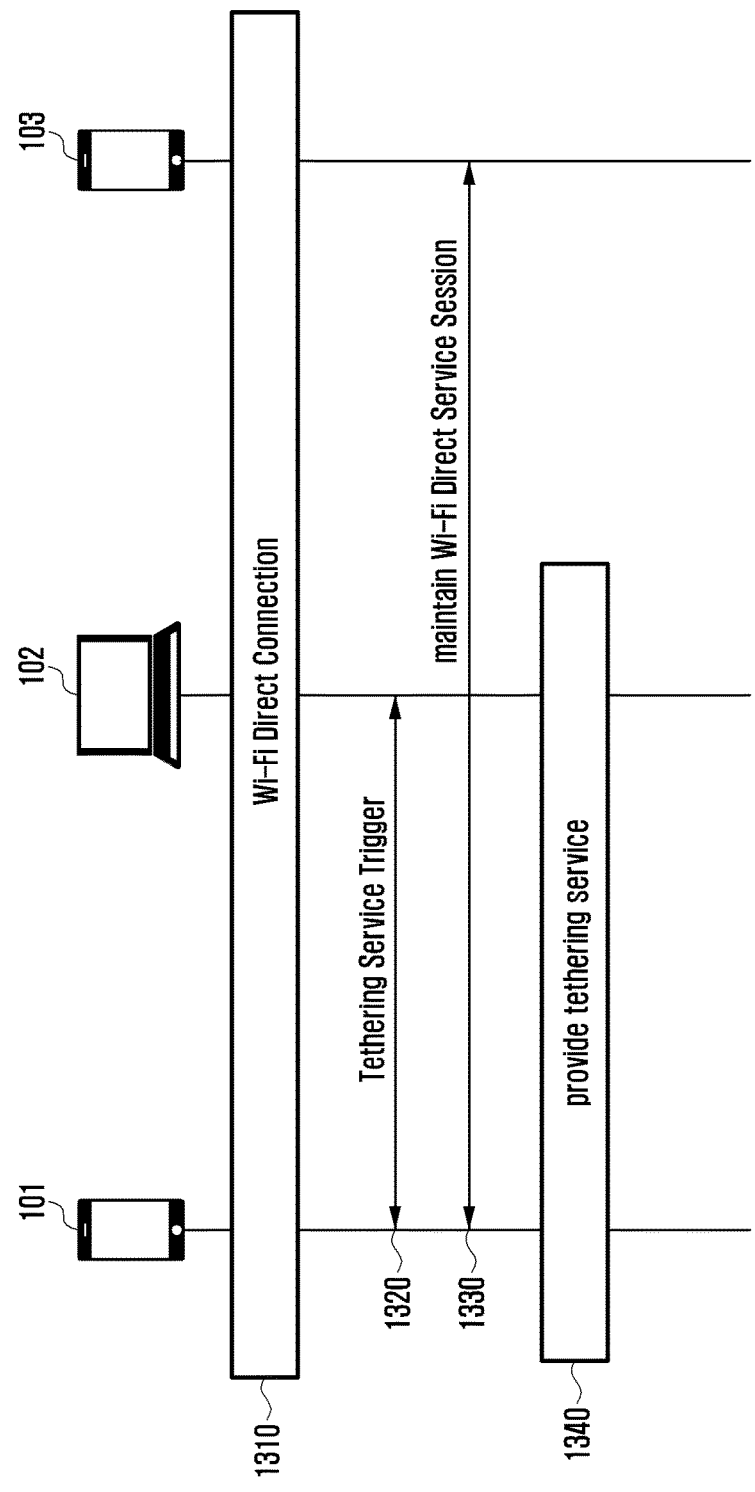
FIG. 13 is a diagram illustrating an example method for an electronic device to provide the Wi-Fi Direct service and the WSB tethering service simultaneously within a 1:N Wi-Fi direct group according to various example embodiments of the present disclosure.

FIG. 13 is a diagram illustrating an example method for an electronic device to provide the Wi-Fi Direct service and the WSB tethering service simultaneously within a 1:N Wi-Fi direct group according to various example embodiments of the present disclosure.

Referring to FIG. 13, it may be possible to provide the Wi-Fi Direct service and the WSB tethering service simultaneously even in a 1:N (e.g., 1:2) Wi-Fi Direct group as well as in the 1:1 Wi-Fi Direct group.

According to various example embodiments of the present disclosure, the electronic device 101 may establish Wi-Fi direct connections with the electronic devices 102 and 103 at step 1310. For example, the electronic device 101 may form a Wi-Fi Direct-based P2P group with the electronic devices 102 and 103. The electronic device 101 may exchange WSB service capability information, tethering service capability information, connected network information, and other information concerning the WSB-service (e.g., service name, advertisement ID, and service information) with the electronic devices 102 and 103.

According to various example embodiments of the present disclosure, the electronic device 101 may detect a tethering service trigger for providing the tethering service to the electronic device 102 at step 1320. For example, the electronic device 102 that is capable of providing the tethering service may initiate the tethering service according to an input made through a user interface (UI). In this case, the electronic device may provide the tethering service only to the electronic devices 102 and 103 belonging to the Wi-Fi Direct group.

According to various example embodiments of the present disclosure, the electronic device 101 may maintain the Wi-Fi Direct service session established with the electronic device 103 at step 1330 regardless of tethering service information exchange with the electronic device 102.

According to various example embodiments of the present disclosure, the electronic device 101 may provide at least one of the Wi-Fi Direct service and WSB tethering service at step 1340 according to the exclusive use or simultaneous use policy as described above.

Figure 14:
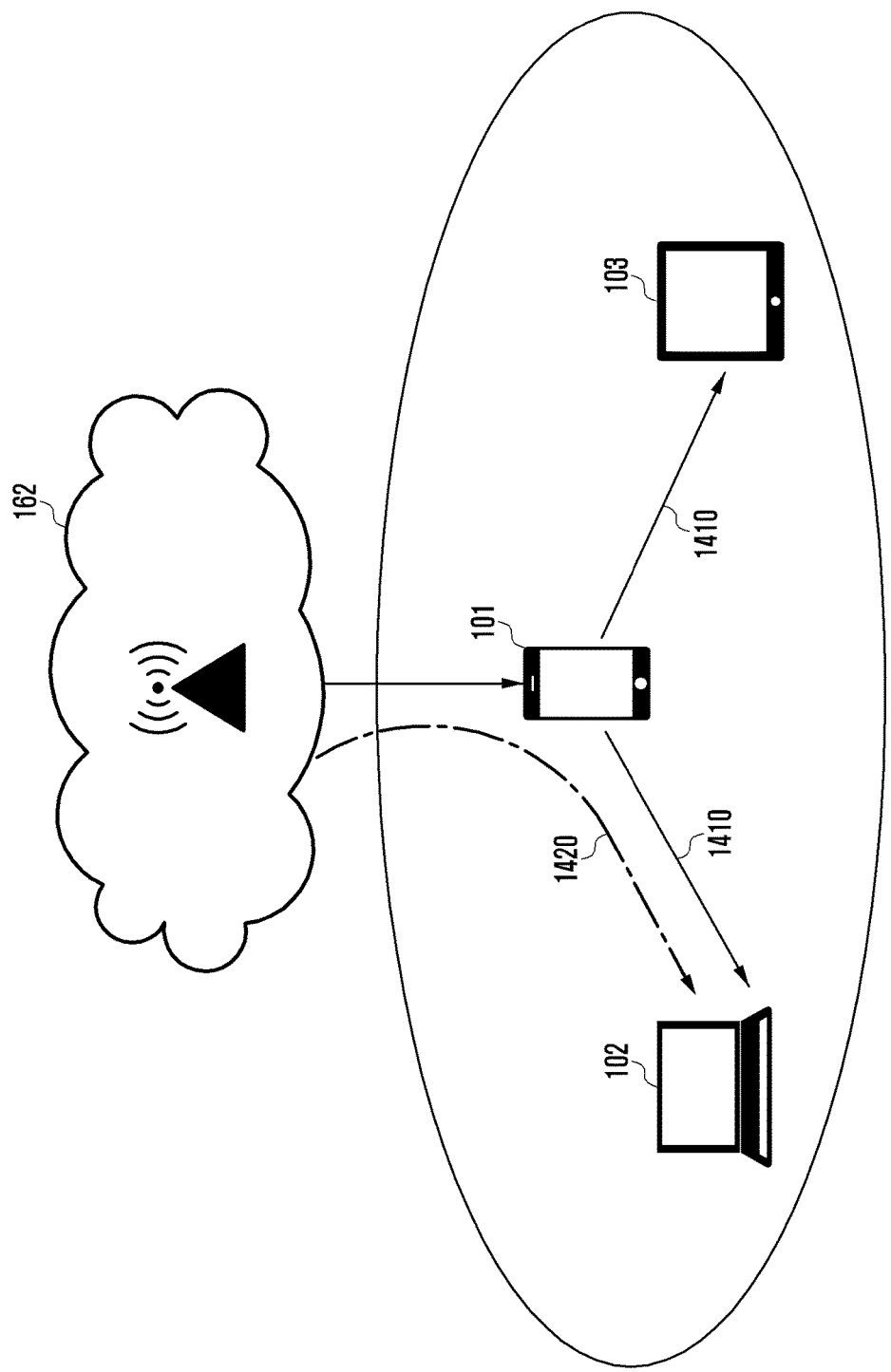
FIG. 14 is a diagram illustrating an example situation in which an electronic device provides the Wi-Fi Direct service and the WSB tethering service simultaneously in a 1:N Wi-Fi Direct group according to various example embodiments of the present disclosure.

FIG. 14 is a diagram illustrating an example situation where an electronic device provides the Wi-Fi Direct service and the WSB tethering service simultaneously in a 1:N Wi-Fi Direct group according to various example embodiments of the present disclosure.

In the example embodiment of FIG. 14, the electronic device 101, which is directly connected to a network (e.g., Wi-Fi network and cellular network) 162, may operate as a tethering host. The electronic devices 101, 102, and 103 may form a Wi-Fi Direct group as denoted by reference number 1410 and, in the group, the electronic device 101 is operating as a group owner while the electronic devices 102 and 103 are operating as group clients.

According to various example embodiments of the present disclosure, the electronic device 101 may establish a tethering link 1420 with the electronic device 102 such that the electronic device 102 connects to the network 162 via the electronic device 101. Of course, the electronic device 101 may also provide the tethering service to the electronic device 103 as well as to the electronic device 102.

Figure 15:
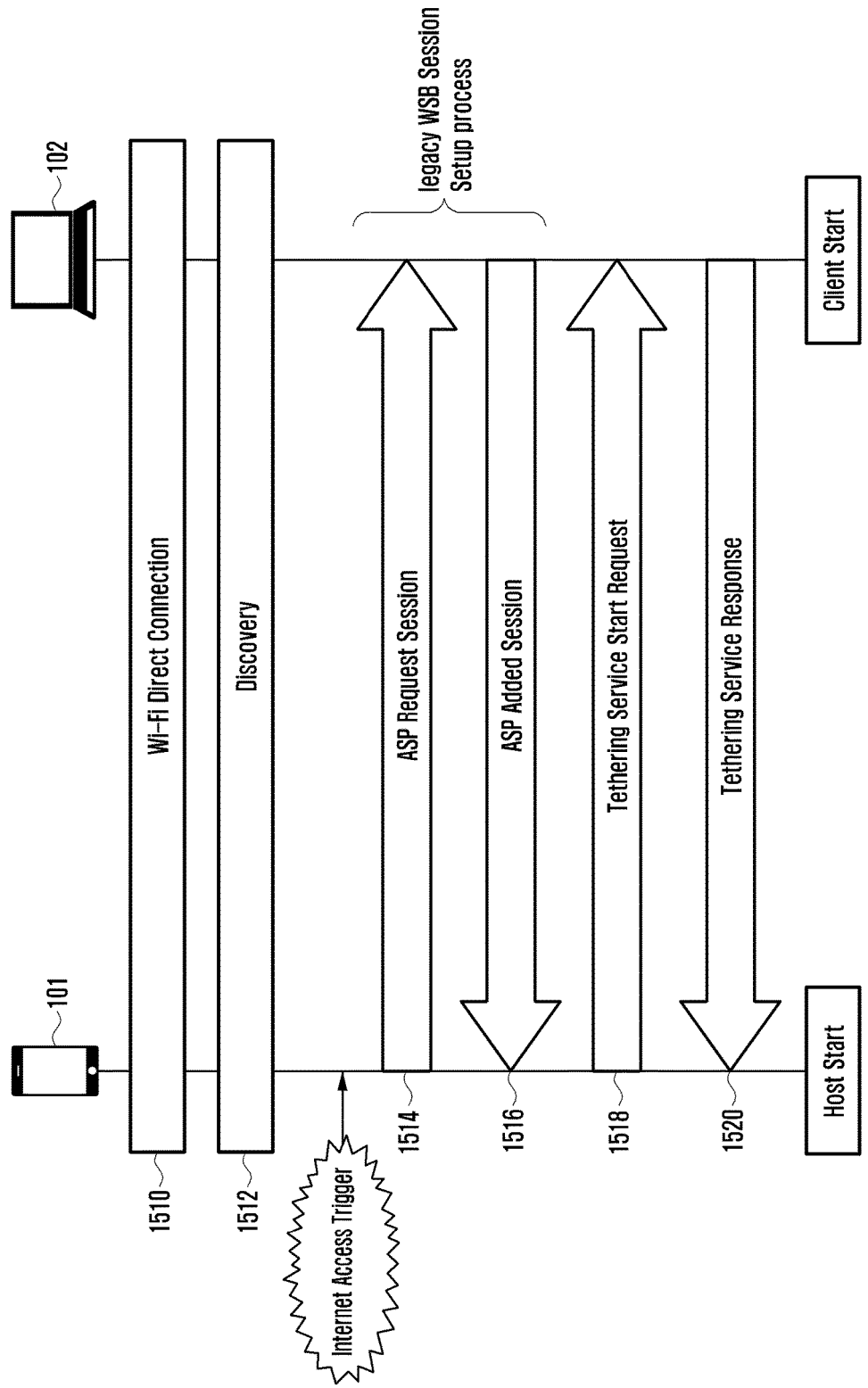
FIG. 15 is a diagram illustrating an example procedure for triggering the tethering service of an electronic device according to a second example embodiment of the present disclosure.

FIG. 15 is a diagram illustrating an example procedure for triggering the tethering service of an electronic device according to the second embodiment of the present disclosure.

In FIG. 15, unlike the embodiment of FIG. 10, the tethering service trigger messages may be exchanged between the electronic devices 101 and 102 after the session has been set up.

According to various example embodiments of the present disclosure, the electronic device 101 may establish a Wi-Fi Direct connection with the electronic device 102 at step 1510. For example, the electronic devices 101 and 102 form a Wi-Fi Direct-based P2P group.

According to various example embodiments of the present disclosure, the electronic device 101 may perform a discovery operation for the WSB service at step 1512. For example, the electronic devices 101 and 102 may exchange WSB service capability information, tethering service capability information, connected network information, and other information concerning the WSB-service (e.g., service name, advertisement ID, and service information).

According to various example embodiments of the present disclosure, the electronic device 101 may perform a WSB session setup process for WSB tethering at steps 1514 and 1516. For example, the electronic device may configure a WSB session using the legacy standard-based WSB information acquired at step 1512.

According to various example embodiments of the present disclosure, the electronic device 101 may transmit a tethering service request message to the electronic device 102 at step 1518 and receives a tethering service response message from the electronic device 102 at step 1520. For example, the electronic device 101 as a tethering host and the electronic device 102 as a tethering client check their roles for the tethering service through the message exchange.

Figure 16:
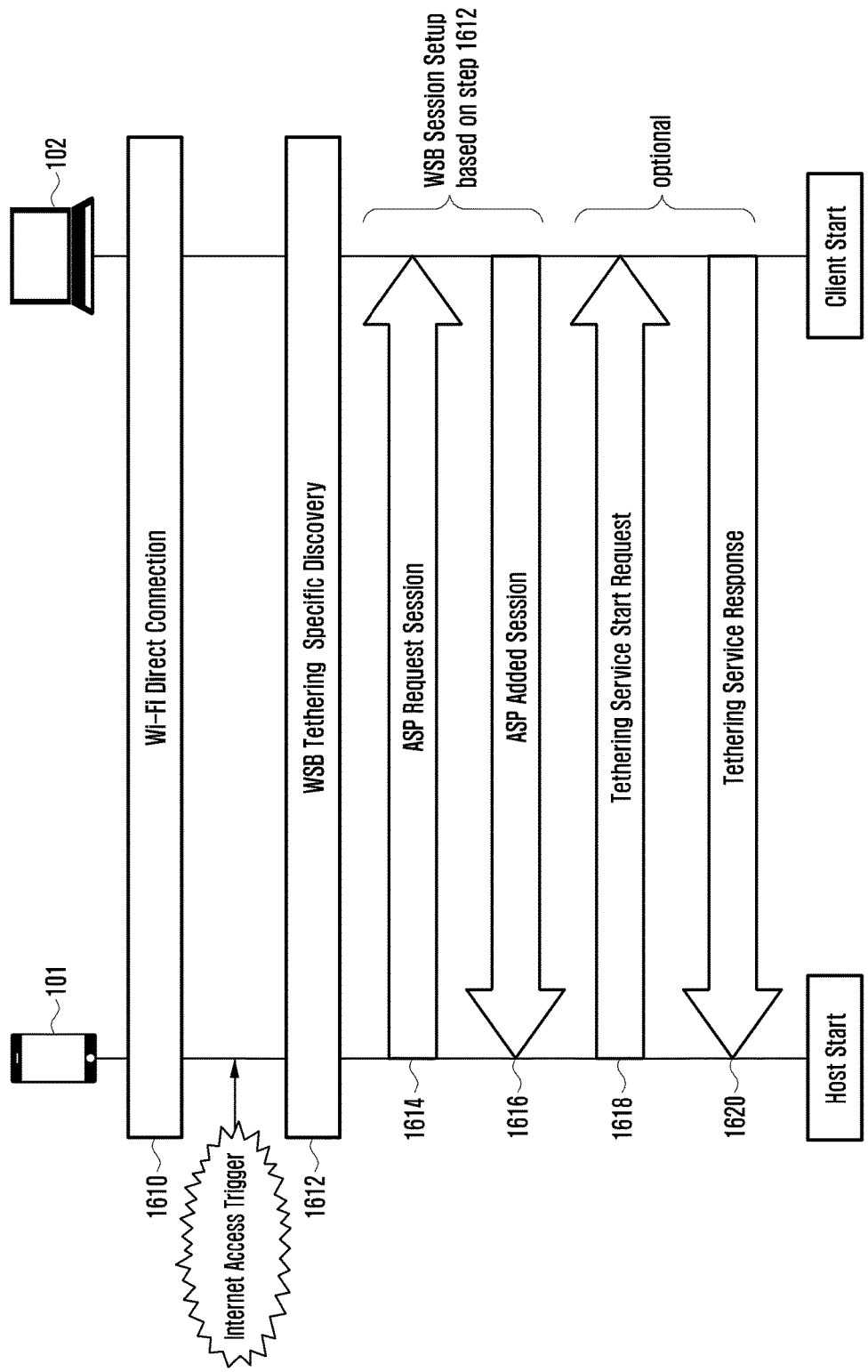
FIG. 16 is a diagram illustrating an example procedure for triggering the tethering service of an electronic device according to a third example embodiment of the present disclosure.

FIG. 16 is a diagram illustrating an example procedure for triggering the tethering service of an electronic device according to a third example embodiment of the present disclosure.

In FIG. 16, unlike the embodiment of FIG. 10, the tethering service trigger messages may be exchanged between the electronic devices 101 and 102 after the session has been set up, or the message exchange may be omitted. The example embodiment of FIG. 16 is identical with the embodiment of FIG. 15 with the exception that the information being exchanged at step 1512 of FIG. 15 is different from the information being exchanged at step 1612 of FIG. 16.

According to various example embodiments of the present disclosure, the electronic device 101 may establish a Wi-Fi Direct connection with the electronic device 102 at step 1610. For example, the electronic devices 101 and 102 may form a Wi-Fi Direct-based P2P group.

According to various example embodiments of the present disclosure, the electronic device 101 may perform a discovery operation for the WSB service at step 1612. At step 1512 of FIG. 15, the WSB discovery information specified in the WSB standard is used along with additional tethering capability information; however, at step 1612 of FIG. 16, the discovery information specified for the WSB tethering (e.g., service name and service information) is used. For example, the electronic device 101 may include a new type of service name format. For example, the information on the role for the tethering service, e.g., tethering host and tethering client, is included in the legacy architectural element design for specifying only the host and device. Accordingly, the electronic devices 101 and 120 may exchange the service name generated in the form of org.wi-fi.wsb.tethering_host.xx.xx.xx and other tethering capability information generated in an extended format at step 1612. Meanwhile, the electronic device 101 may include the remaining fields [baseclass].[subclass].[protocol] of the service name, instead of the tethering capability information, in the architectural element. Such a discovery process 1612 may be performed with tethering-related information automatically according to the configuration or when Internet Access is triggered according to the UI manipulation of the user.

According to various example embodiments of the present disclosure, the electronic device 101 may perform WSB session setup for WSB tethering at steps 1614 and 1616. For example, the electronic device 101 may set up a WSB communication session based on the WSB tethering information acquired at step 1612.

According to various example embodiments of the present disclosure, the electronic devices 101 and 120 may exchange messages for triggering the tethering service at steps 1618 and 1620. For example, the electronic device 101 as a tethering host and the electronic device 102 as a tethering client check their roles in the tethering service through the message exchange. The roles as the host and client for the tethering service may be negotiated through steps 1612 to 1616 and, in this case, steps 1618 and 1620 may be omitted.

Figure 17:
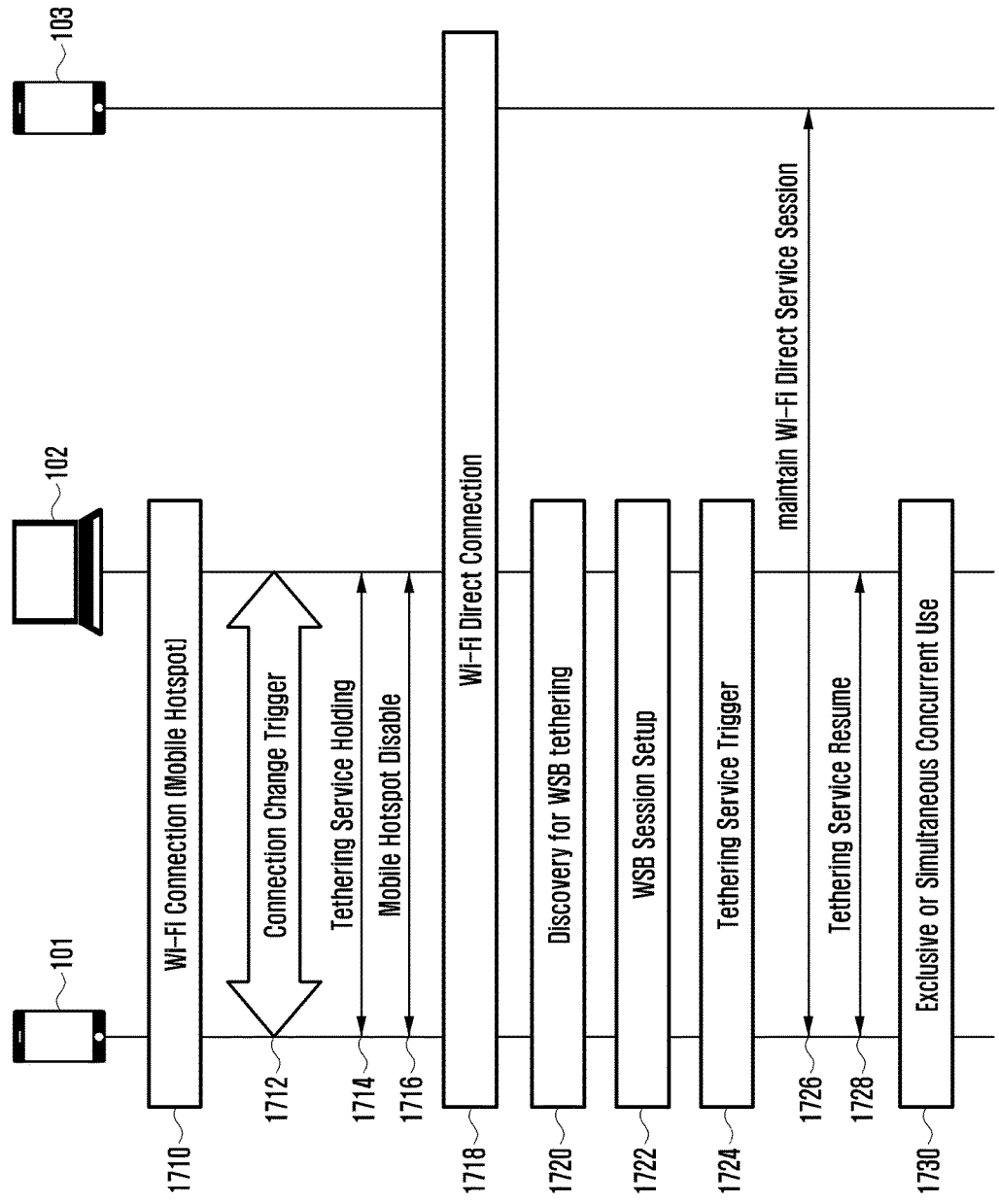
FIG. 17 is a diagram illustrating an example method for switching the operation mode of the electronic device from the Wi-Fi hotspot tethering service to Wi-Fi Direct tethering service according to various example embodiments of the present disclosure.

FIG. 17 is a diagram illustrating an example method for switching the operation mode of the electronic device from the Wi-Fi hotspot tethering service to Wi-Fi Direct tethering service according to various example embodiments of the present disclosure.

The electronic devices that use the Wi-Fi hotspot (or mobile hotspot) tethering service to establish a Wi-Fi Direct P2P connection need to tear down the Wi-Fi hotspot connection and newly establish a Wi-Fi Direct connection. Accordingly, the electronic device having a Wi-Fi Direct connection cannot provide the user with a Wi-Fi hotspot tethering service.

In the example embodiment of FIG. 17, an electronic device is capable of using a Wi-Fi Direct service and Wi-Fi tethering service simultaneously by switching from the ongoing mobile hotspot-based tethering service that has been established to maintain the Wi-Fi tethering service to the WSB-based tethering service.

According to various example embodiments of the present disclosure, the electronic device 101 may provide the tethering service to the electronic device using a Wi-Fi-based mobile hotspot at step 1710. In this example, the electronic device 101 operates as a mobile hotspot host, and the electronic device 102 operates as a mobile hotspot client.

According to various example embodiments of the present disclosure, the electronic devices 101 and 102 may exchange messages for changing the ongoing connection at step 1712. For example, if it is necessary for the electronic device 101 providing the mobile hotspot service to establish a Wi-Fi Direct connection with the electronic device 103, the electronic devices 101 and 102 may exchange messages for switching the ongoing connection mode from the mobile hotspot to the Wi-Fi direct.

According to various example embodiments of the present disclosure, the electronic device 101 may not terminate and instead may place on hold the tethering service at step 1714, and the mobile hotspot of the electronic device 101 may be disabled at step 1716. For example, the electronic device 101 may detect a connection handover from the mobile hotspot to the Wi-Fi Direct by exchanging messages with the electronic device and disconnect the ongoing mobile hotspot connection.

According to various example embodiments of the present disclosure, the electronic device 101 may establish Wi-Fi Direct connection with the electronic devices 102 and 103 at step 1718. For example, the electronic devices 101, 102, and 103 may form a Wi-Fi Direct P2P group.

According to various example embodiments of the present disclosure, the electronic device 101 may perform a discovery operation, a session setup operation, and a tethering service trigger operation with the electronic device 102 through steps 1720 to 1724. The detailed descriptions of the respective operations have been made already in the previous embodiments.

According to various example embodiments of the present disclosure, if the operations of steps 1720 to 1724 have been completed, the electronic device 101 may resume to the electronic device 102 the tethering service that was on hold. As described with reference to FIGS. 8 to 12, the electronic devices 101 and 102 may perform the Wi-Fi Direct service and WSB tethering service exclusively or simultaneously at step 1730.

In accordance with various example embodiments of the present disclosure, an electronic device includes a communication interface and a processor which is configured to establish a direct connection with at least one external electronic device located in operable proximity of the electronic device using the communication interface, check a predetermined input, establish a session for connecting the at least one external device to at least one communication network via the electronic device based on the predetermined input, and connect the at least one external electronic device to the at least one communication network via the electronic device during at least part of the direct connection session. As used herein, the term operable proximity may refer, for example, to an electronic device being within a distance of another device (e.g., an external device) to enable establishing a connection between the devices. For example, as set forth above, when the electronic device is within an operable proximity of the external device, a connection via the communication interface may be realized.

The processor may be configured to use one of the tethering service and hotspot service to connect the at least one external electronic device to the at least one communication network.

The processor may be configured to establish a wireless-fidelity serial bus session as at least part of the session.

The processor may be configured to establish another direct connection with another external electronic device during at least part of the period of the connection to the at least one communication network using the communication interface.

The processor may be configured to establish another direct connection with another external electronic device and connect the external electronic device to the at least one communication network via the electronic device during at least part of the period of the two direct connections.

The direct connection may be a wireless-fidelity direct connection.

The processor may check at least one of an input made at the electronic device to provide a tethering service to the external electronic device and a request for providing the tethering service, the request being made by the external electronic device.

In accordance with various example embodiments of the present disclosure, an electronic device includes a communication interface and a processor which is configured to connect at least one external electronic device located in proximity of the electronic device to an at least one communication network using a communication interface, check a predetermined input, establish a session for a direct connection with the at least one external electronic device based on the predetermined input, and enable the direct connection with the at least one external device during at least part of the session maintained with the at least one network.

The processor may be configured to establish a wireless-fidelity serial bus session and connect the at least one external electronic device to the at least one communication network using the session.

The predetermined input may be an input made for use of a peer to peer (P2P) service.

In accordance with various example embodiments of the present disclosure, a tethering method of an electronic device includes establishing a direct connection with at least one external electronic device located in proximity of the electronic device using the communication interface, checking a predetermined input, establishing a session for connecting the at least one external device to at least one communication network via the electronic device based on the predetermined input, and connecting the at least one external electronic device to the at least one communication network via the electronic device during at least part of the direct connection session.

Connecting the at least one external electronic device to the at least one communication network may include activating one of the tethering service and hotspot service.

Establishing the session may include establishing a wireless-fidelity serial bus session as at least part of the session.

The method may further include establishing another direct connection with another external electronic device during at least part of the period of the connection to the at least one communication network using the communication interface.

The method may further include establishing another direct connection with another external electronic device and connecting the external electronic device to the at least one communication network via the electronic device during at least part of the period of the two direct connections The direct connection may be a wireless-fidelity direct connection.

Checking the predetermined input may include checking at least one of an input made at the electronic device to provide a tethering service to the external electronic device and a request for providing the tethering service, the request being made by the external electronic device.

In accordance with various example embodiments of the present disclosure, a tethering method of an electronic device includes connecting at least one external electronic device located in proximity of the electronic device to an at least one communication network using a communication interface, checking a predetermined input, establishing a session for a direct connection with the at least one external electronic device based on the predetermined input, and enabling the direct connection with the at least one external device during at least part of the session maintained with the at least one network.

The method may further include establishing a wireless-fidelity serial bus session and connecting the at least one external electronic device to the at least one communication network using the session.

The predetermined input may be an input made for use of a peer to peer (P2P) service.

As described above, the tethering service provision method and device of the present disclosure is advantageous in terms of utilizing a Wi-Fi Serial Bus (WSB) to provide the Wi-Fi-based tethering service during the ongoing Wi-Fi Direct communication. Also, the tethering service provision method and device of the present disclosure is advantageous of providing communication services seamlessly without releasing the ongoing Wi-Fi Direct connection between two terminals. Also, the tethering service provision method and apparatus of the present disclosure is advantageous in terms of providing the WSB-based tethering service and the Wi-Fi Direct service simultaneously.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an example embodiment of the present disclosure may include various processing circuitry, such as, for example, and without limitation, at least one of a dedicated processor, a CPU, an Application-Specific Integrated Circuit (ASIC) chip, a Field-Programmable Gate Array (FPGA), and a programmable-logic device for performing certain operations which have been known or are to be developed in the future.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the various example embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although example embodiments of the disclosure have been described in detail above, it should be understood that many variations and modifications of the disclosure herein described, which may be apparent to those skilled in the art, will still fall within the spirit and scope of the example embodiments of the disclosure as defined in the appended claims.

What is claimed is:

1. An electronic device comprising:
a communication interface comprising communication circuitry; and
at least one processor,
wherein the at least one processor is configured to:
establish a direct WiFi connection session for peer to peer (P2P) communication with at least one external electronic device located in operable proximity of the electronic device via the communication circuitry,
responsive to receipt of an input comprising a tethering request from the external electronic device during at least part of the direct WiFi connection session, establish a WSB session comprising a tethering session for connecting the at least one external device to at least one communication network via the electronic device based on the input, wherein the WSB session and the direct WiFi connection session have different interface addresses and IP addresses, but are maintained simultaneously, and
connect, while maintaining the direct WiFi connection session for peer to peer communication, the at least one external electronic device to the at least one communication network via the electronic device so that the electronic device can simultaneously provide to the external device both the direct WiFi connection session and the WSB session comprising the tethering session.

2. The electronic device of claim 1, wherein the at least one processor is configured to use one of a tethering service and a hotspot service to connect the at least one external electronic device to the at least one communication network for the tethering session.

3. The electronic device of claim 1, wherein the at least one processor is configured to establish a wireless-fidelity serial bus session as at least part of the tethering session.

4. The electronic device of claim 1, wherein the at least one processor is configured to establish another direct connection with another external electronic device during at least part of the period of the connection to the at least one communication network using the communication circuitry.

5. The electronic device of claim 1, wherein the at least one processor is configured to establish another direct connection with another external electronic device and to connect the external electronic device to the at least one communication network via the electronic device during at least part of the period of the two direct connections.

6. The electronic device of claim 1, wherein the direct connection comprises a wireless-fidelity direct connection.

7. An electronic device comprising:
a communication interface comprising communication circuitry; and
at least one processor,
wherein the at least one processor is configured to:
connect at least one external electronic device located in operable proximity of the electronic device to an at least one communication network using the communication circuitry for a WSB session comprising a tethering session,
check a predetermined input from the at least one external electronic device after the tethering session has been established and responsive thereto, establish a direct WiFi connection session for a direct connection with the at least one external electronic device based on the predetermined input, wherein the WSB session and the direct WiFi connection session have different interface addresses and IP addresses, but are maintained simultaneously, and
enable the direct WiFi connection with the at least one external device during at least part of the tethering session maintained with the at least one network so that the electronic device can simultaneously provide to the external device both the direct connection session for sharing files and the tethering session.

8. The electronic device of claim 7, wherein the at least one processor is configured to establish a wireless-fidelity serial bus session and to connect the at least one external electronic device to the at least one communication network for the tethering session using the wireless-fidelity serial bus session.

9. The electronic device of claim 7, wherein the predetermined input comprises an input made for use of a peer to peer (P2P) service.

10. A method of tethering an electronic device, the method comprising:
    establishing a direct WiFi connection session for peer to peer (P2P) communication with at least one external electronic device located in operable proximity of the electronic device via a communication interface;
    responsive to receipt of an input comprising a tethering request from the external electronic device during at least part of the direct connection session, establishing a WSB session comprising a tethering session connecting the at least one external device to at least one communication network via the electronic device based on the input, wherein the WSB session and the direct WiFi connection session have different interface addresses and IP addresses, but are maintained simultaneously; and
    connecting, while maintaining the direct WiFi connection session for peer to peer communication, the at least one external electronic device to the at least one communication network via the electronic device so that the electronic device can simultaneously provide to the external device both the direct WiFi connection session and the WSB session comprising the tethering session.

11. The method of claim 10, wherein connecting the at least one external electronic device comprises using one of a tethering service and a hotspot service to connect the at least one external electronic device to the at least one communication network for the tethering session.

12. The method of claim 10, wherein establishing the tethering session comprises establishing a wireless-fidelity serial bus session as at least part of the session.

13. The method of claim 10, further comprising establishing another direct connection with another external electronic device during at least part of the period of the connection to the at least one communication network using the communication interface.

14. The method of claim 10, further comprising:
    establishing another direct connection with another external electronic device; and
    connecting the external electronic device to the at least one communication network via the electronic device during at least part of the period of the two direct connections.

15. The method of claim 10, wherein the direct connection comprises a wireless-fidelity direct connection.

16. A method of tethering an electronic device, the method comprising:
    connecting at least one external electronic device located in operable proximity of the electronic device to an at least one communication network for a WSB session comprising a tethering session;
    checking a predetermined input from the at least one external electronic device after the tethering session has been established and responsive thereto establishing a direct WiFi connection session for a direct connection with the at least one external electronic device based on the predetermined input, wherein the WSB session and the direct WiFi connection session have different interface addresses and IP addresses, but are maintained simultaneously; and
    enabling the direct WiFi connection session with the at least one external device during at least part of the tethering session maintained with the at least one network so that the electronic device simultaneously provides to the external device both the direct connection session for sharing files and the tethering session.

17. The method of claim 16, further comprising:
    establishing a wireless-fidelity serial bus session; and
    connecting the at least one external electronic device to the at least one communication network using the serial bus session.

18. The method of claim 17, wherein the predetermined input comprises an input made for use of a peer to peer (P2P) service.

* * * * *